United States Patent
Lambert (10) Patent No.: US 9,458,642 B2
(45) Date of Patent: *Oct. 4, 2016

(54) STAY CABLES FOR STRUCTURES

(71) Applicant: Ultimate Strength Cable, LLC, Tulsa, OK (US)

(72) Inventor: Walter L. Lambert, Muskogee, OK (US)

(73) Assignee: Ultimate Strength Cable, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,645

(22) Filed: Feb. 13, 2014

(65) Prior Publication Data

US 2014/0301863 A1 Oct. 9, 2014

Related U.S. Application Data

(63) Continuation of application No. 13/910,186, filed on Jun. 5, 2013, now Pat. No. 8,667,766, which is a continuation of application No. 13/181,551, filed on Jul. 13, 2011, now Pat. No. 8,474,219.

(51) Int. Cl.
| | |
|---|---|
| *E04H 12/00* | (2006.01) |
| *E04H 12/20* | (2006.01) |
| *H01Q 1/12* | (2006.01) |
| *F03D 9/00* | (2016.01) |

(52) U.S. Cl.
CPC ............. *E04H 12/00* (2013.01); *E04H 12/20* (2013.01); *F03D 9/002* (2013.01); *F03D 13/20* (2016.05); *H01Q 1/1242* (2013.01); *F05B 2240/912* (2013.01); *F05B 2260/30* (2013.01); *Y02B 10/30* (2013.01); *Y02E 10/728* (2013.01)

(58) Field of Classification Search
CPC ....... E04H 12/00; F03D 13/20; F03D 9/002; H01Q 1/1242; Y02E 10/728; Y02B 10/30; F05B 2240/912; F05B 2260/30

USPC .......... 52/40, 146, 148, 152, 831, 832, 834, 52/835, 843, 844, 845, 848, 850
See application file for complete search history.

(56) References Cited

U.S. PATENT DOCUMENTS

| | | | | | |
|---|---|---|---|---|---|
| 364,077 | A | * | 5/1887 | Addis | 52/146 |
| 1,537,698 | A | * | 5/1925 | Robinson | 14/22 |
| 2,095,721 | A | * | 10/1937 | Sunderland | 14/22 |
| 2,945,457 | A | * | 7/1960 | Avery et al. | 105/190.1 |
| 3,500,625 | A | * | 3/1970 | Gokyu | 57/222 |
| 3,526,570 | A | * | 9/1970 | Beighley et al. | 428/544 |
| 3,531,811 | A | * | 10/1970 | Baker | 14/23 |
| 3,659,633 | A | * | 5/1972 | Durkee et al. | 140/111 |
| 3,919,762 | A | * | 11/1975 | Borelly | 29/447 |
| 4,203,267 | A | * | 5/1980 | Langhorst | 52/148 |
| 4,258,518 | A | * | 3/1981 | Xercavins | 52/223.13 |
| 4,533,297 | A | * | 8/1985 | Bassett | 416/132 B |
| 4,594,827 | A | * | 6/1986 | Finsterwalder | 52/223.13 |
| 4,673,309 | A | * | 6/1987 | Schlaich et al. | 403/265 |
| 4,979,871 | A | * | 12/1990 | Reiner | 415/4.2 |
| 5,083,469 | A | * | 1/1992 | Percheron et al. | 73/862.42 |
| 6,614,125 | B2 | * | 9/2003 | Willis et al. | 290/55 |
| 6,979,175 | B2 | * | 12/2005 | Drake | 416/11 |
| 7,124,460 | B2 | * | 10/2006 | Lecinq et al. | 14/22 |
| 7,508,088 | B2 | * | 3/2009 | Kothnur et al. | 290/44 |
| 7,683,498 | B2 | * | 3/2010 | Stommel | 290/44 |
| 2008/0078128 | A1 | * | 4/2008 | Livingston et al. | 52/40 |
| 2008/0250576 | A1 | * | 10/2008 | Brand et al. | 14/22 |
| 2009/0167023 | A1 | * | 7/2009 | Nies | 290/55 |
| 2009/0307998 | A1 | * | 12/2009 | Zavitz et al. | 52/152 |
| 2010/0319983 | A1 | * | 12/2010 | De Abreu et al. | 174/45 TD |

* cited by examiner

*Primary Examiner* — Mark Wendell
(74) *Attorney, Agent, or Firm* — Scott P. Zimmerman, PLLC

(57) ABSTRACT

A mast is erected to support a load. At least one stay cable supports the mast. The stay cable is oriented to the mast within a radial distance of the blade from the mast. The stay cable is stressed to support the mast while the wind drives the blade without collision of the stay cable.

9 Claims, 9 Drawing Sheets

STAY CABLES FOR STRUCTURES

CROSS-REFERENCE TO RELATED APPLICATIONS

This application is a continuation of U.S. application Ser. No. 13/910,186 filed Jun. 5, 2013 and now issued as U.S. Pat. No. 8,667,766, which is a continuation of U.S. application Ser. No. 13/181,551 filed Jul. 13, 2011 and now issued as U.S. Pat. No. 8,474,219, with both applications incorporated herein by reference in their entireties. This application also relates to U.S. application Ser. No. 13/084,693, filed Apr. 12, 2011, entitled "Parallel Wire Cable," and incorporated herein by reference in its entirety.

COPYRIGHT NOTIFICATION

A portion of the disclosure of this patent document and its attachments contain material which is subject to copyright protection. The copyright owner has no objection to the reproduction by anyone of the patent document or the patent disclosure, as it appears in the United States Patent and Trademark Office patent files or records, but otherwise reserves all copyrights whatsoever.

BACKGROUND

Exemplary embodiments generally relate to development of renewable energy resources and, in particular, to the development of renewable wind energy. Exemplary embodiments generally relate to structures that support wind turbines or antennas, to dynamo plants, and to fluid reaction surfaces (i.e., impellers) and, more particularly, to structures with bracing or guys.

High oil prices have renewed our interest in wind energy. Wind turbines are being planned and built to convert wind energy into electricity. Some wind turbines are built atop masts, while other wind turbines are supported by towers. A mast is a vertical structure supported by one or more stay cables (or "guys"). The stay cables provide stability to the mast to reduce oscillations from wind and seismic events. A tower, on the other hand, is a larger, stronger, and more expensive self-supporting structure designed to withstand the wind and seismic events. While the mast is less expensive than the self-supporting tower, additional land is needed for the stay cables. Moreover, the mast must withstand a sizable portion of the wind and seismic events. Often, then, design tradeoffs are required when stay cables are used.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. Those of ordinary skill in the art further understand that the exemplary cables described herein are for illustrative purposes and, thus, are not intended to be limited to any particular manufacturing process and/or manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another.

Exemplary embodiments conserve energy and further develop renewable energy sources. Exemplary embodiments describe a superior stay cable for vertical and non-vertical structures, such as monopoles, wind turbines, antennas, and buildings. The stay cable of this invention is constructed using parallel wires, whereas conventional stay cables are wound strands of wires. The parallel wire construction has superior strength and stiffness when compared to conventional strand cable. Moreover, exemplary embodiments have a much smaller diameter and weigh less than conventional strand cable. Exemplary embodiments thus describe a superior stay cable that reduces the costs of monopoles, wind turbines, antennas, and buildings.

Because the stay cable is stronger than conventional designs, the structures may be reduced in size and/or weight. Wind turbines, antennas, and any other generally vertical structure may thus be cheaper to manufacture, cheaper to transport, and cheaper to build. Masts that support wind turbines, for example, may be smaller, lighter, and cheaper, thus improving a cost-benefit analysis of alternative wind energy. Less material and labor are required to manufacture and erect wind turbines. Smaller and lighter designs also reduce transportation costs. Exemplary embodiments thus reduce the costs of alternative wind energy and reduce reliance on fossil fuel.

Figure 1:
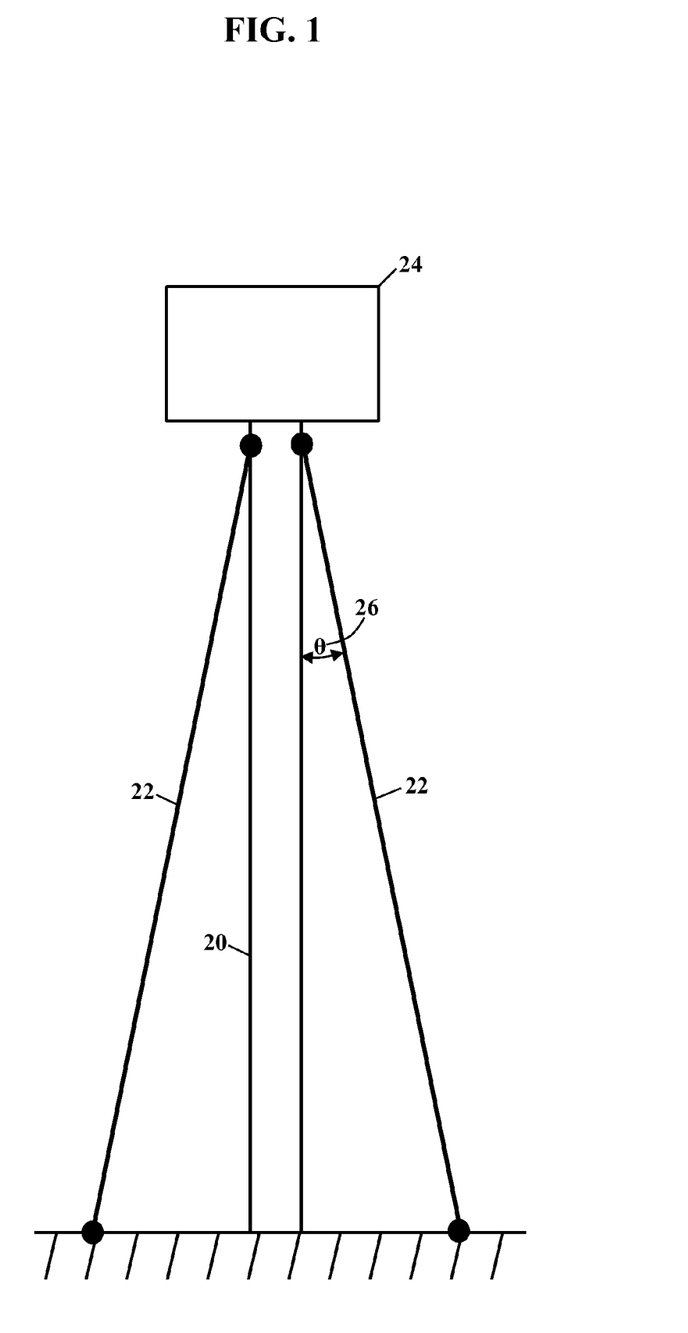
FIG. 1 is a schematic illustrating an operating environment, according to exemplary embodiments.

FIG. 1 is a schematic illustrating an operating environment, according to exemplary embodiments. FIG. 1 illustrates a generally vertical structure 20 supported by at least one stay cable 22. The vertical structure 20 is erected to support any apparatus 24, such as a wind turbine, drilling rig, antenna, and/or utility cable (as later paragraphs will explain). The stay cable 22 may be tensioned to add stability to the vertical structure 20. Because stay cables (or "guys") have long been used to stabilize structures, this disclosure will not provide a detailed explanation of known concepts. Here, though, the stay cable 22 has superior strength and stiffness when compared to conventional stay cables (as later paragraphs will explain), so the stay cable 22 may be orientated at a much smaller angle θ (illustrated as reference numeral 26) than conventional designs. Indeed, the improved stay cable 22 may be oriented at ten degrees (10°) or even less, whereas conventional stay cable designs are traditionally oriented at forty five degrees (45°) or more.

Figure 2:
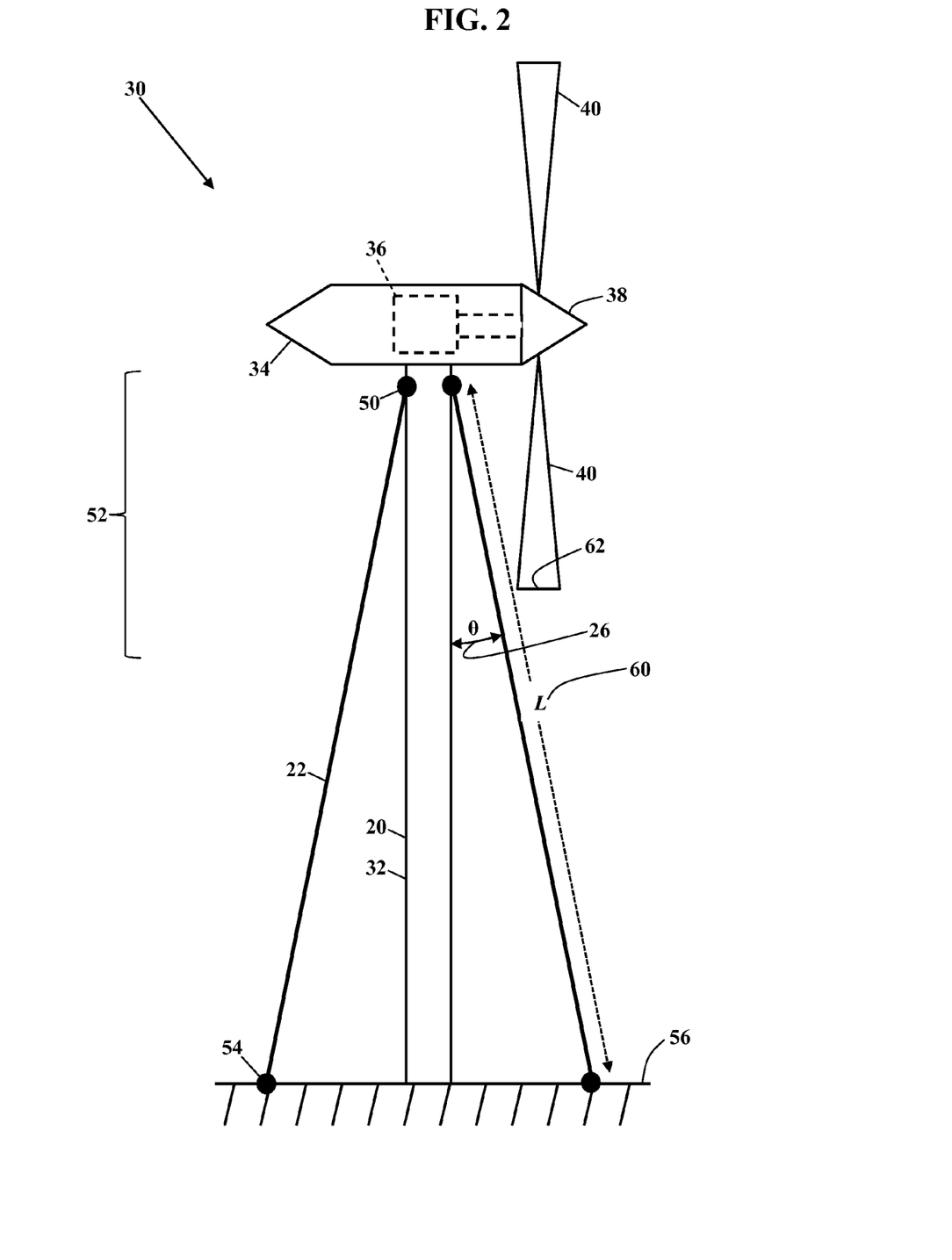
FIGS. 2 and 3 are schematics illustrating a wind energy installation, according to exemplary embodiments.
Figure 3:
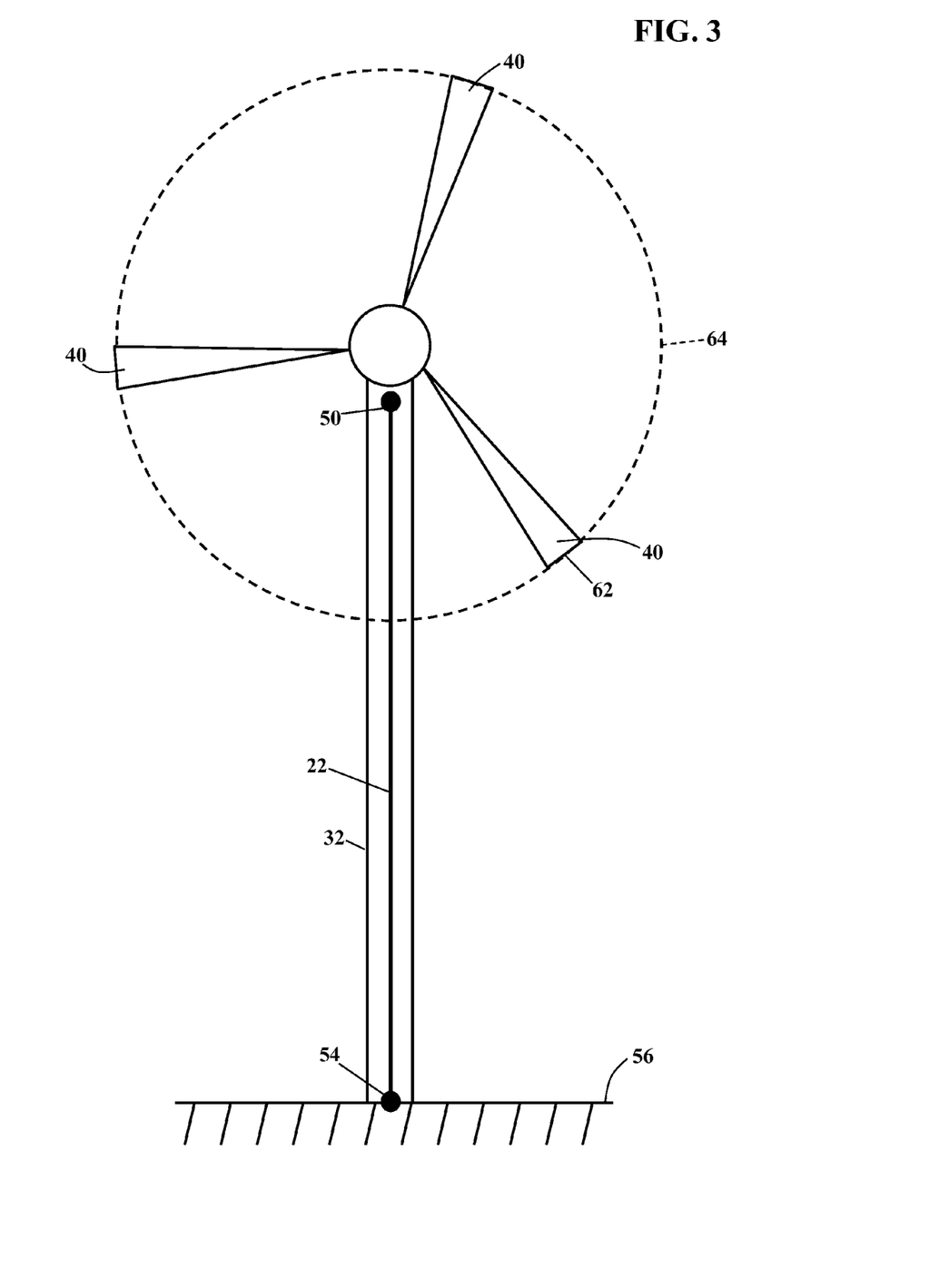

FIGS. 2 and 3 are schematics illustrating a wind energy installation 30, according to exemplary embodiments. Here the vertical structure 20 is illustrated as a monopole mast 32 supporting a nacelle 34. The nacelle 34 may include an alternator/generator 36 coupled to a rotor assembly 38. Wind drives one or more blades 40 of the rotor assembly 38. The rotor assembly 38 turns or drives the alternator/generator 36. The alternator/generator 36 converts mechanical energy of the rotor assembly 38 into electrical energy (either alternating current or direct current, as is known). The wind energy installation 30 is generally well-known to those of ordinary skill in the art, so this disclosure will not provide a detailed explanation of the wind energy installation 30.

The mast 32 is supported by the at least one stay cable 22. Each stay cable has an upper end 50 attached to an upper region 52 of the mast 32. Each stay cable 22 also has a lower, opposite end 54 that is anchored to some point, such as earth 56. The stay cable 22 is tensioned and stressed to stabilize the mast 32. The stay cable 22 may extend an entire length L (illustrated as reference numeral 60) from the upper end 50 to the lower, opposite end 54. Dampers or other shock-absorbing devices may also be used, as is known.

The stay cable 22, though, does not collide with the rotating blade 40. Because the stay cable 22 has superior strength to similarly-sized conventional designs, the stay cable 22 may be orientated inside the spinning blade 40. Conventional stay cables are traditionally oriented at 45 degrees, so conventional stay cables interfere with a tip 62 of the spinning blade 40. The superior stay cable 22 of this invention, though, may be tensioned and still oriented at the much smaller angle θ (illustrated as reference numeral 26) of ten degrees (10°) or even less. That is, as wind spins the blades 40 of the rotor assembly 38, the stay cables 22 will not intersect a rotor disk 64 (best illustrated in FIG. 3).

Figure 4A:
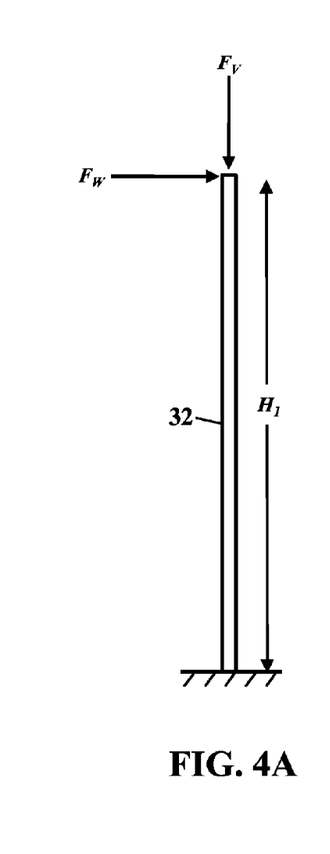
FIGS. 4A, 4B, 5A, and 5B are schematics illustrating free body diagrams for monopole designs, according to exemplary embodiments.
Figure 4B:
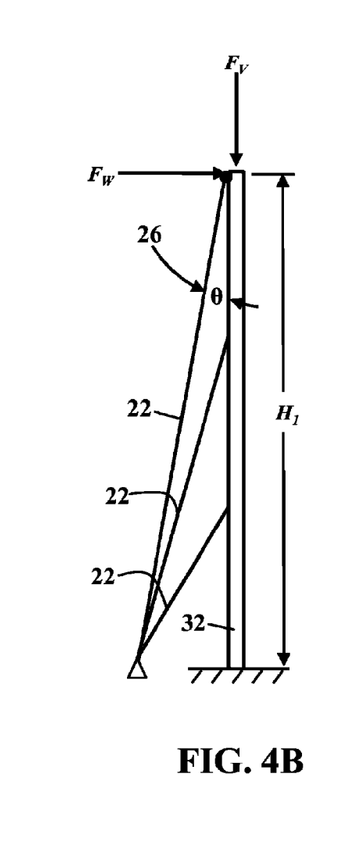
Figure 5A:
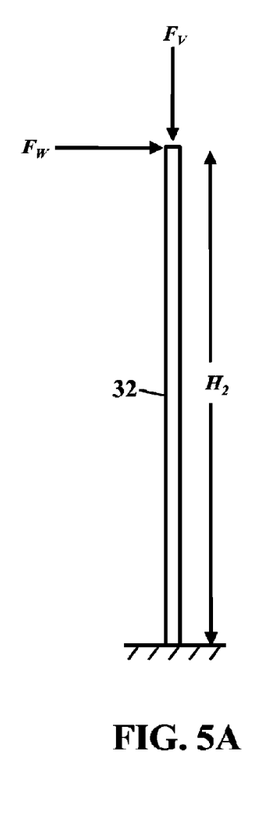
Figure 5B:
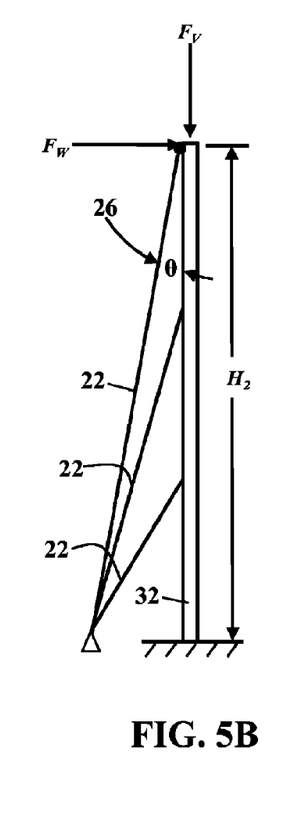

FIGS. 4 and 5 are schematics illustrating free body diagrams for monopole designs, according to exemplary embodiments. FIG. 4 illustrates calculations for a height of 270 feet, while FIG. 5 illustrates calculations for a height of 450 feet. These calculations show that the stay cables 22 greatly add stability to the monopole mast 32, even at small angles. These calculations also show that the monopole 32 may be increased in height by using the stronger stay cables 22. Indeed, the below calculations show that the monopole mast 32 may be increased in height (from 270 feet to 450 feet), while maintaining the stay cables 22 at less than or equal to seven degrees (7°).

FIG. 4A illustrates a baseline calculation. The mast 32 is assumed to be 270 feet in height, ten feet (10') in diameter, and constructed of steel tube having a one inch (1") wall thickness. The mast 32 is subjected to a conservative horizontal wind load of 50,000 pounds force (or 50 kips) and a vertical load of 130,000 pounds force (or 130 kips). FIG. 4A illustrates the mast 32 with no supporting stay cables. Without stay cables, the maximum moment at the base is 13,830 kilopounds force feet (or $138.3 \times 10^3$ feet-pounds force) and a maximum deflection at the tip of the mast 32 is 30.4 inches.

FIG. 4B illustrates the braced monopole design. The mast 32 has the same dimensions (e.g., 270 ft. in height, 10 ft. in diameter, and 1" wall thickness) and loading (50 kips horizontal load and 130 kips vertical load). Here, though, the stay cables 22 brace the mast at ⅓ heights (that is, stay cables 22 are attached at 90 feet, 180 feet, and 270 feet). Each stay cable 22 is constructed of steel using parallel wires with six square inches (6 in$^2$) of total metallic area. Each stay cable 22 has a 230 ksi yield stress and a 270 ksi ultimate load capacity. If a top stay cable 22 is oriented at θ=7°, the maximum moment at the base is 2,894 kilopounds force feet, and the maximum deflection at the tip of the mast 32 is reduced to 6.7 inches. The stresses in the stay cables 22 are 172 ksi for the upper stay, 149 ksi for a middle stay, and 81 ksi for a lower stay.

FIG. 4B thus illustrates a substantial improvement. When FIG. 4B is compared to FIG. 4A, one sees that the stay cables 22 substantially reduce deflection at the tip of the mast 32 (6.7 inches verses 30.4 inches). Moreover, the stay cables 22 are oriented at seven degrees (7°), which is much less than is used with conventional designs. Conventional stay cables are traditionally oriented at about forty five degrees (45°) or more from the mast. Because the stay cables of this invention have superior strength, the stay cables may be oriented at the much smaller angle θ of ten degrees (10°) or even less. Even at such small angles, though, the stresses in the stay cables 22 are substantially less than the yield stress, indicating that even smaller angles, smaller diameter cables, and/or higher loads may be used.

Another dramatic comparison is evident. A conventional mast for a conventional wind turbine is fifteen feet (15 ft.) in diameter. Such a large mast is difficult and costly to transport, often requiring specialized rail cars and/or barges. The above calculations, though, were based on a mast diameter of only ten feet (10 ft.). Exemplary embodiments, then, permit the mast 32 to be substantially reduced in diameter, while still supporting equivalent loadings. Moreover, the smaller mast 32 is more easily transported and may be hauled over-the-road by conventional tractor trailers. The smaller mast 32 also weighs substantially less than conventional designs, so material, installation, and erection costs are reduced.

The calculations illustrated by FIGS. 4A and 4B are simple examples. The above calculations were based on a mast of ten feet (10') in diameter and constructed of steel tube having a one inch (1") wall thickness. The diameter, wall thickness, and the number of stay cables 22 may vary according to the load requirements. Indeed, the mast 32 may be tapered, and the concentric height locations of the stay cables 22 may be varied along the mast 32 to provide a more efficient design per the individual desired load required results. The ten feet diameter with one inch (1") wall thickness thus only illustrates the dramatic reduction in size and costs that are possible using the stronger stay cables 22.

Exemplary embodiments also reduce other loads. For wind towers, the acute angle θ (illustrated as reference numeral 26) of the stay cables 22 may also result in a substantial downward vertical load on connections between sections of the mast or tower. This vertical load, though, reduces the upward vertical load on the bolted connections from wind and turbine induced torque, which in turn reduces the tensile and fatigue load on the bolts. The loads used in the above calculations are the wind shear for the turbine and wind vanes at cut-off wind speed of a maximum 60 miles per hour. These loads reflects data obtained for deflection at the turbine during power production. For simplicity, full gravity and maximum code-induced wind loads are not included, but the design of the guyed tower will be more than adequate. The turbines are basically reducing their wind vane connection loads starting at about 35 miles per hour until about 60 miles per hour, at which point the turbines may be totally disconnected for any power production.

FIG. 5 illustrates another design comparison. Here the mast is 450 feet in height, but still 10 feet in diameter with a 1-inch wall thickness. The mast 32 is again subjected to the horizontal load of 50,000 pounds force (or 50 kips) and the vertical load of 130,000 pounds force (or 130 kips). FIG. 5A illustrates no supporting stay cables, while FIG. 5B illustrates bracing at ⅓ heights (that is, stay cables 22 are attached at 150 feet, 300 feet, and 450 feet). Without the stay cables, FIG. 5A illustrates the maximum moment at the base is 24,106 kilopounds force feet with a maximum deflection of 148.3 inches at the tip. In FIG. 5B, though, the mast 32 is again braced by the stay cables 22, with the top stay cable 22 oriented at seven degrees (7°). The maximum moment at the base is 3,400 kilopounds force feet, and the maximum deflection at the tip of the mast is reduced to 14.9 inches. The stresses in the stay cables are 235 ksi for the upper stay, 149 ksi for a middle stay, and 81 ksi for a lower stay.

Again, then, the stay cables 22 provide substantial improvements. Even when the mast 32 is increased in height to 450 feet, the orientation of seven degrees (7°) still maintains deflection to less than fifteen inches. Even at this higher height, the stresses in the stay cables 22 are still within acceptable safety limits. The diameter of the mast 32 is still substantially smaller than conventional designs (10 feet verses 15 feet), so the mast 32 weighs less, is easier to transport, and is easier to erect. Exemplary embodiments thus provide substantially reduced costs for wind turbines, drilling rigs, antennas, and any other vertical mast.

Figure 6:
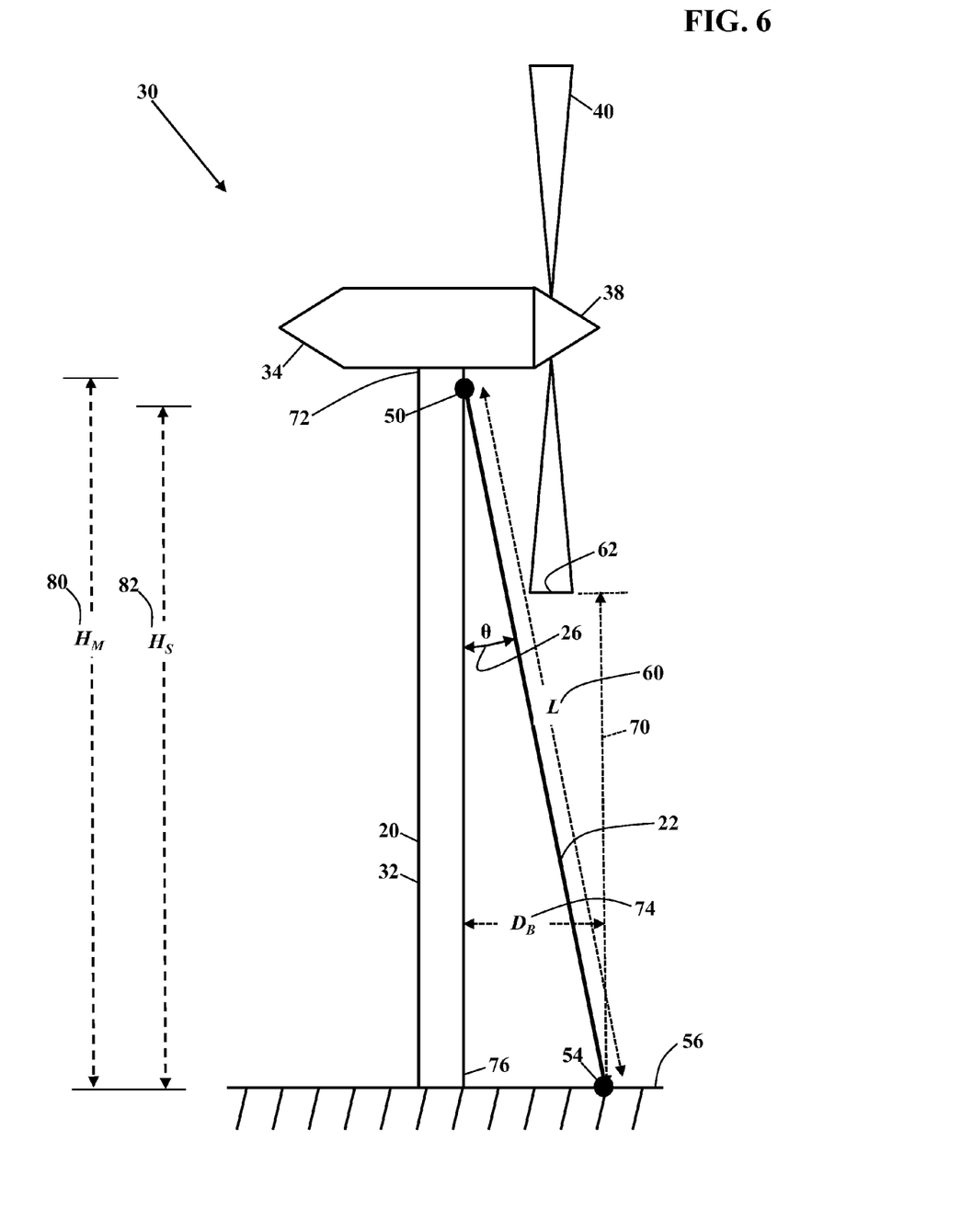
FIG. 6 is another schematic illustrating the wind energy installation, according to exemplary embodiments.

FIG. 6 is another schematic illustrating the wind energy installation 30, according to exemplary embodiments. Because the stay cable 22 has superior strength, the stay cable 22 may be attached at a higher height, and anchored at a lesser distance from the mast 32, than traditional designs. Indeed, exemplary embodiments may be oriented above the tip 62 of the blade 40 without collision. As FIG. 6 illustrates, the upper end 50 of the stay cable 22 is attached at a height 70 greater than the tip 62 of the blade 40 of the rotor assembly 38. The upper end 50 of the stay cable 22 is attached near or at a top 72 of the mast 32. The lower, opposite end 54 of the stay cable 22 is anchored at a distance $D_B$ (illustrated as reference numeral 74) from a base 76 of the mast 32. The stay cable 22 is strong enough to wholly extend the entire length L (illustrated as reference numeral 60) from the upper end 50 to the lower, opposite end 54. The stay cable 22 may even comprise multiple, spliced sections or elements to extend the length L (or longer). Dampers or other shock-absorbing devices may also be used, as is known.

The angle θ may be mathematically defined. The mast 32 has a height $H_M$ (illustrated as reference numeral 80), and the upper end 50 of the stay cable 22 is attached at a height $H_S$ (illustrated as reference numeral 82). The lower, opposite end 54 of the stay cable 22 is anchored at the distance $D_B$ (illustrated as reference numeral 74) from the base 76 of the mast 32. The stay cable 22 is attached at the much smaller acute angle θ (illustrated as reference numeral 26) than conventional designs. The acute angle θ may be determined from the trigonometric relation:

$$\tan\theta = \frac{D_B}{H_S}$$

For maximum support, though, the stay cable 22 may be attached as high up the mast 32 as needed. The stay cable 22 is strong enough to be attached at or nearly equal to the height $H_M$ of the mast 32. Substitution yields:

$$\tan\theta = \frac{D_B}{H_M}$$

As the above paragraphs explained, the angle θ is substantially less than conventional designs. The angle θ, in fact, may be in the range of nearly zero to ten degrees (0>θ≥10), which is much less than that possible with conventional designs. Indeed, as the calculations accompanying FIGS. 4 and 5 showed, the angle θ may be about seven degrees (7°) for common wind turbine loading.

Figure 7:
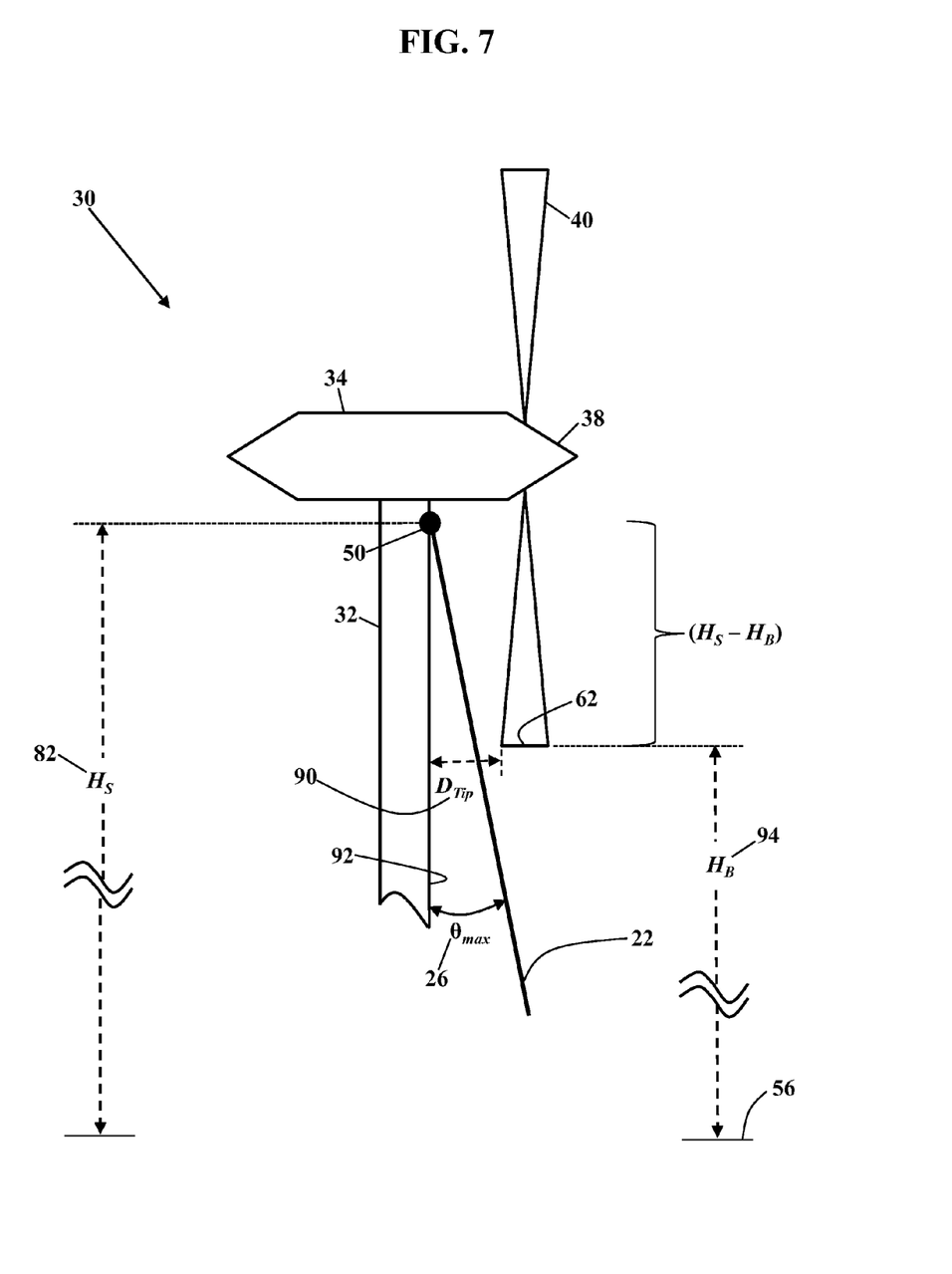
FIG. 7 is a detailed schematic illustrating a maximum orientation of a stay cable, according to exemplary embodiments.

FIG. 7 is a detailed schematic illustrating a maximum orientation of the stay cable 22, according to exemplary embodiments. For simplicity, though, the mast 32 is only partially illustrated. As earlier paragraphs explained, the rotating blade 40 cannot collide with the stay cable 22. The stay cable 22, when tensioned and stressed, cannot impinge or intersect the spinning blade 40 (e.g., the rotor disk 64 illustrated in FIG. 3). As FIG. 7 illustrates, then, the angle θ has a maximum value $\theta_{max}$ that permits unobstructed rotation of the rotor assembly 38. If the orientation of the stay cable 22 exceeds the angle $\theta_{max}$, then the rotating blade 40 may impact the stay cable 22. The angle $\theta_{max}$ may thus be expressed in terms of a distance $D_{Tip}$ (illustrated as reference numeral 90) between the mast 32 and a width of the tip 62 of blade 40. (The distance $D_{Tip}$ is affected by the mounting and/or gearing of the nacelle 34, the design of the blade 40, and other considerations which are not relevant here.) FIG. 7 illustrates a situation when the tip 62 of the blade 40 is in its lowest position (e.g., a six o'clock position), and the distance $D_{Tip}$ is measured radially and normally from an outer surface 92 of the mast 32. The maximum value of the acute angle θ is calculated as:

$$\tan\theta_{max} = \frac{D_{Tip}}{(H_S - H_B)},$$

where $H_B$ (illustrated as reference numeral 94) is a height of the tip 62 of the blade 40 of the rotor assembly 38, as measured from earth or ground 56. As the wind energy installation 30 is being designed, the maximum angular orientation of the stay cable 22 (e.g., the maximum value of the angle $\theta_{max}$) may be determined from the height of the mast 32, the height of the tip 62, and the distance $D_{Tip}$. Any orientation greater than $\theta_{Max}$ may cause the stay cable 22 to collide with the rotating blade 40. Because conventional stay cables must be much larger in diameter, the larger diameter prohibitively increases costs and is too heavy to handle.

Exemplary embodiments thus reduce the costs of the wind energy installation 30. Because the stay cable 22 is superior to conventional designs, the stay cable 22 may be attached higher up the mast 32 (e.g., the height $H_S$), and closer to the base 68 (e.g., the distance $D_B$). Moreover, the size of the mast 32 may be reduced for a given weight of the nacelle 34. Conversely, the mast 32 may support a greater size and weight of the nacelle 34, thus allowing the rotor assembly 38 and the alternator/generator 36 to be increased in capacity to generate more electricity. For example, longer blades may be used to turn a larger alternator/generator 36. Regardless, material, transportation, and labor costs are reduced for a given design of the wind energy installation 30.

Figure 8:
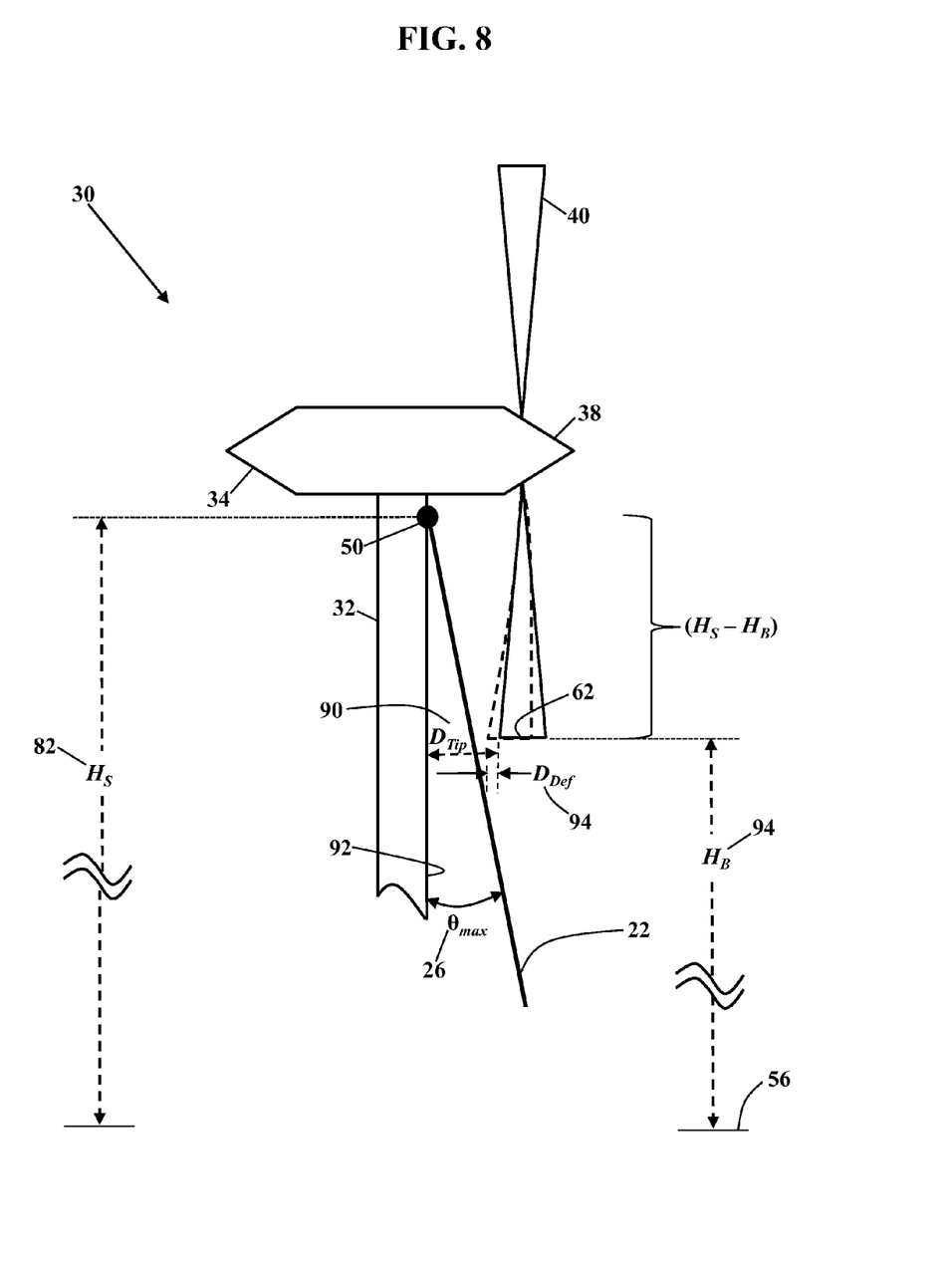
FIG. 8 is another more detailed schematic illustrating the wind energy installation, according to exemplary embodiments.

FIG. 8 is another more detailed schematic illustrating the wind energy installation 30, according to exemplary embodiments. Here the blade 40 of the rotor assembly 38 may deflect due to wind. As wind encounters the blade 40, forces against the blade 40 may cause the blade 40 to bend or deflect. As FIG. 8 illustrates, the wind may deflect the tip 62 of the blade 40 a deflection distance $D_{def}$ (illustrated as reference numeral 94). The deflection distance $D_{def}$ will depend on the design, size, and material of the blade 40, along with wind speed, and perhaps even other factors. Regardless, any deflection in the blade 40 will reduce the distance $D_{Tip}$ (illustrated as reference numeral 90) between the mast 32 and the tip 62 of blade 40. The maximum value of the acute angle $\theta$ may thus be modified to account for the deflection distance $D_{def}$ of the blade 40:

$$\tan\theta_{Max} = \frac{(D_{Tip} - D_{def})}{(H_S - H_B)}.$$

If the blade 40 deflects due to wind forces, then the maximum acute angle $\theta_{Max}$ of the stay cable 22 may be computed to still prevent collisions with the rotating, deflecting blade 40.

The above calculations apply to swiveling nacelles. Some nacelles are mounted to a bearing which permits the nacelle 34 to turn, or swivel, about the mast 32. The nacelle 34 may thus capture wind energy from any direction, still without collision of the stay cable 22. Because the nacelle 34 may swivel about a centerline of the mast 32, each stay cable 22 must have an orientation that clears the rotor disk 64 (illustrated in FIG. 3) in any direction of wind. As the nacelle 34 swivels about a vertical axis of the mast 32, the tip 62 of the blade 40 traces a circle about the mast 32. The circle has a radius $R_{Tip}$ that is equal to the distance $D_{Tip}$ (illustrated as reference numeral 90 in FIGS. 7 & 8) between the mast 32 and the tip 62 of blade 40. That is, when the nacelle 34 swivels about the mast 32, the tip 62 of the blade 40 defines a zone beyond which any stay cable 22 cannot be placed. If the stay cable 22 is oriented outside the circle (of radius $D_{Tip}$) at the height $H_B$ (illustrated as reference numeral 94), then the stay cable 22 may collide with the spinning blade 40. Again, then, the maximum value of the angle $\theta$ is calculated as:

$$\tan\theta_{Max} = \frac{D_{Tip}}{(H_S - H_B)},$$

where $H_B$ is the height of the tip 62 of the blade 40 of the rotor assembly 38, as measured from earth or ground. The acute angle $\theta$ may also be corrected for wind deflection of the blade 40 (as explained above), thus yielding:

$$\tan\theta_{Max} = \frac{(D_{Tip} - D_{Def})}{(H_S - H_B)}.$$

At the height $H_B$ of the tip 62 of the blade 40, the orientation of the stay cable 22 may not exceed the maximum acute angle $\theta_{Max}$ and/or the distance $(D_{Tip}-D_{Def})$. Prudent designers may even include a safety factor that further reduces $\theta_{Max}$.

The above figures illustrate that the vertical structure 20 (e.g., the mast 32) may have any number of the stay cables 22. If the vertical structure 20 is a utility pole, for example, then perhaps only a single stay cable 22 is needed. Other vertical structures, however, may require two, three, or more stay cables (as FIGS. 4 and 5 illustrated). Multiple stay cables 22 may be radially configured about the mast 32 in equally- or unequally-spaced arrangements.

The mast 32 may have any design and/or construction. The mast 32 may be constructed of any material, such as steel, aluminum, composite, concrete, and/or wood. The mast 32 may have a tubular, tapered, conical, and/or lattice design. The mast 32 may also have any height; indeed, many of the world's tallest structures are radio masts that support communications equipment. The mast 32, though, may support any equipment or load, including oil rigs or platforms, electrical equipment, bridges, and observation decks.

Figure 9:
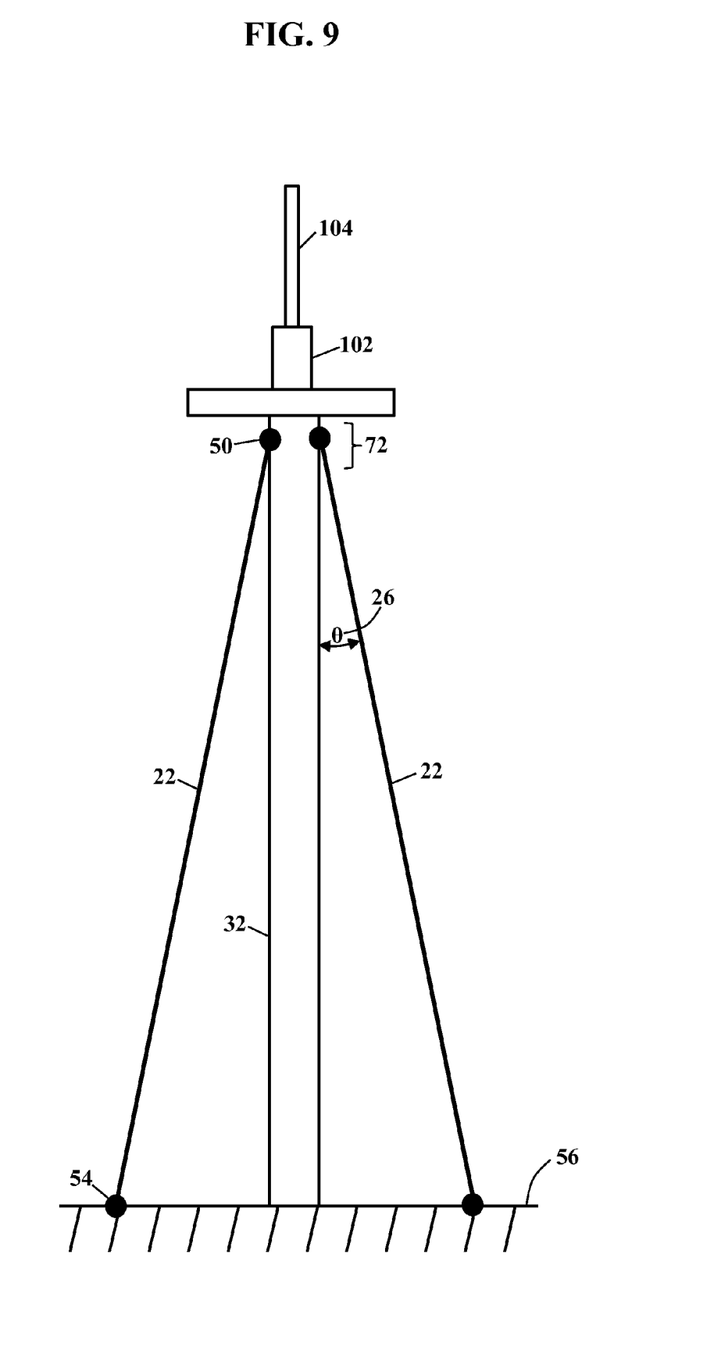
FIG. 9 is a schematic illustrating an antenna installation, according to exemplary embodiments.

FIG. 9 is a schematic illustrating an antenna installation 100, according to exemplary embodiments. Here the mast 32 is erected to support communications equipment 102, such as an antenna 104 for radio and/or cellular networks. The upper end 50 of the stay cable 22 attaches to or near the top 72 of the mast 32, while the lower, opposite end 54 anchors at the earth or ground 56. Again, the stay cable 22 is stressed to support the mast 32 at the acute angle $\theta$ (illustrated as reference numeral 26). Because the stay cables 22 have superior strength for similar sizes of conventional strand designs, the stay cables 22 may be oriented such that the angle 26 is less than or equal to ten degrees (10°).

The stay cables 22 may include other features. Tall masts, for example, may reach into controlled airspace, so the mast 32 and/or the stay cables 22 may require lights, visible flags, or other safety markers. When the stay cables 22 are used with the communications equipment 102, any insulator may sheath at least a portion of the stay cable 22 to improve electromagnetic properties (e.g., insulation or conductivity).

The stay cables 22 may also include any end attachments. The upper end 50 of the stay cable 22, for example, may utilize any means of attaching the stay cable 22 to the mast 32. The opposite, lower end 54 may, likewise, utilize any means of anchoring to the ground or earth.

The stay cables 22 may also be utilized in any environment. Many wind turbines, oil platforms, antennas, and other vertical structures are erected in the ocean. Other vertical structures are erected onshore. Exemplary embodiments may be utilized in any onshore or offshore installation and in any ambient environment (e.g., mountains, deserts, arctic poles, plains, beaches).

The stay cables 22 may also support cantilevered structures. Some structures outwardly cantilever, such as entry overhangs, pedestrian overlooks, and even portions of buildings (e.g., the Clinton Presidential Library and Museum in Little Rock, Ark. USA). The stay cables 22 may be used to support cantilevered structures at the acute angle θ (illustrated as reference numeral 26) without obtrusive bracing. The strength of the stay cables 22 may thus be advantageously used in the design of cantilevered structures.

The stay cables 22 have a parallel construction. Each individual wire in the stay cable 22 is parallel to every other wire. The individual wires in the stay cable 22 are parallel along their entire length and may also be equal in length to every other wire. Each wire in the stay cable 22 is also individually pretensioned. Exemplary embodiments apply a tension value to each wire in the stay cable 22. That is, each individual wire in the stay cable 22 may have an equal, or nearly equal, tension to every other wire in the stay cable 22. Exemplary embodiments pretension every wire in the stay cable 22. The tension value is individually applied or pulled to each wire in the stay cable 22. Individual pre-tensioning of each wire provides lighter, cheaper, and stronger stay cable designs. An individually-tensioned stay cable 22 weighs significantly less than conventional designs, but the strength of the stay cable 22 is still greater than conventional designs. Alternatively, exemplary embodiments may be used to construct a stay cable 22 that is similar in size to conventional designs, but is substantially stronger to support greater loads. Regardless, exemplary embodiments offer greater design alternatives that require less material cost. If the reader desires a more detailed explanation, the reader is invited to consult U.S. application Ser. No. 13/084,693, filed Apr. 12, 2011, entitled "Parallel Wire Cable," and incorporated herein by reference in its entirety.

Tension is applied to each wire, not strands of wires. Methods are known that tension strands of plural wires. A strand, in the art of stay cable, is defined as a group of multiple wires. Conventional methods are known that apply tension to a strand of multiple wires. Exemplary embodiments, in contradistinction, apply the tension value to each individual wire in the stay cable 22. Each wire has the equal tension value as every other wire in the stay cable 22.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. An apparatus, comprising:
a mast;
a rotor assembly supported by the mast, the rotor assembly having a blade driven by wind; and
a stay cable supporting the mast, the stay cable oriented to the mast according to an angle θ defined as tan $$\theta = \frac{D_B}{H_S},$$

the stay cable stressed to support the mast while the wind drives the blade without collision of the stay cable.

2. The apparatus of claim 1, wherein the angle θ is less than ten degrees from the mast.

3. The apparatus of claim 1, wherein the angle θ is less than seven degrees from the mast.

4. The apparatus of claim 1, wherein the stay cable has an end attached to the mast.

5. The apparatus of claim 1, wherein the stay cable has an end anchored at earth.

6. The apparatus of claim 1, further comprising a generator converting mechanical energy of the rotor assembly into electrical energy.

7. The apparatus of claim 1, further comprising an alternator converting mechanical energy of the rotor assembly into electrical energy.

8. The apparatus of claim 1, further comprising multiple stay cables supporting the mast.

9. The apparatus of claim 1, further comprising multiple blades of the rotor assembly.

* * * * *